US011741568B2

(12) United States Patent
Kou et al.

(10) Patent No.: US 11,741,568 B2
(45) Date of Patent: Aug. 29, 2023

(54) SYSTEMS AND METHODS FOR LOW-POWER, REAL-TIME OBJECT DETECTION

(71) Applicants: Baidu USA, LLC, Sunnyvale, CA (US); Baidu.com Times Technology (Beijing) Co., Ltd., Beijing (CN)

(72) Inventors: Haofeng Kou, Palo Alto, CA (US); Kuipeng Wang, Beijing (CN); Le Kang, Mountain View, CA (US); Xuejun Wang, Guangdong (CN); Yingze Bao, Mountain View, CA (US)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 252 days.

(21) Appl. No.: 16/770,063

(22) PCT Filed: Jun. 29, 2018

(86) PCT No.: PCT/CN2018/093717
§ 371 (c)(1),
(2) Date: Jun. 4, 2020

(87) PCT Pub. No.: WO2020/000383
PCT Pub. Date: Jan. 2, 2020

(65) Prior Publication Data
US 2021/0173707 A1 Jun. 10, 2021

(51) Int. Cl.
G06F 9/48 (2006.01)
G06T 1/20 (2006.01)
(Continued)

(52) U.S. Cl.
CPC ................ G06T 1/20 (2013.01); G06F 1/329 (2013.01); G06F 9/4893 (2013.01);
(Continued)

(58) Field of Classification Search
CPC .......... G06F 1/329; G06F 1/20; G06F 9/4893; G06F 9/5038
See application file for complete search history.

(56) References Cited

U.S. PATENT DOCUMENTS

2014/0225902 A1   8/2014   Zhu
2016/0042246 A1   2/2016   Herrmann
(Continued)

FOREIGN PATENT DOCUMENTS

CN   102945566 A   2/2013
CN   104408720 A   3/2015
(Continued)

OTHER PUBLICATIONS

Notice of Reasons for Refusal, dated Apr. 5, 2022, in Japanese Patent Application No. JP2020572465A, and the machine translation. (17pgs).

(Continued)

Primary Examiner — Raymond N Phan
(74) Attorney, Agent, or Firm — North Weber & Baugh LLP

(57) ABSTRACT

Described herein are systems and methods for object detection to achieve hard real-time performance with low latency. Real-time object detection frameworks are disclosed. In one or more embodiments, a framework comprises a first CPU core, a second CPU core, and a plurality of shaves. In one or more embodiments, the first CPU core handles general CPU tasks, while the second CPU core handles the image frames from a camera sensor and computation task scheduling. In one or more embodiments, the scheduled computation tasks are implemented by the plurality of shaves using at least one object-detection model to detect an object in an image frame. In one or more embodiments, computation results from the object-detection model with a higher detection probability is used to form an output for object detec- (Continued)

tion. In one or more embodiments, the object-detection models share some parameters for smaller size and higher implementing speed.

20 Claims, 11 Drawing Sheets

(51) Int. Cl.
    *G06F 1/329*      (2019.01)
    *G06F 9/50*      (2006.01)
    *G06N 3/08*      (2023.01)
    *G06F 18/214*      (2023.01)

(52) U.S. Cl.
    CPC .......... *G06F 9/5038* (2013.01); *G06F 18/214* (2023.01); *G06N 3/08* (2013.01)

(56) References Cited

U.S. PATENT DOCUMENTS

| | | |
|---|---|---|
| 2017/0011281 A1 | 1/2017 | Franciscus |
| 2017/0024849 A1 | 1/2017 | Liu et al. |
| 2018/0004275 A1* | 1/2018 | Tubbs .................. G06F 1/3287 |
| 2018/0114290 A1 | 4/2018 | Paltashev et al. |
| 2018/0136912 A1 | 5/2018 | Venkataramani et al. |
| 2019/0108447 A1* | 4/2019 | Kounavis ............... G06V 40/28 |
| 2021/0150666 A1* | 5/2021 | Dolgin ...................... G06T 5/20 |

FOREIGN PATENT DOCUMENTS

| | | |
|---|---|---|
| CN | 105550974 A | 5/2016 |
| CN | 107358157 A | 11/2017 |
| CN | 107766839 A | 3/2018 |
| CN | 107851191 A | 3/2018 |
| EP | 3334142 A1 | 6/2018 |
| JP | 2006302095 A | 11/2006 |
| JP | 2010271861 A | 12/2010 |
| JP | 2018026108 A | 2/2018 |
| WO | 2007099950 A1 | 9/2007 |
| WO | 2015192806 A1 | 12/2015 |
| WO | 2017183034 A1 | 10/2017 |

OTHER PUBLICATIONS

International Search Report, dated Mar. 27, 2019, in International Application No. PCT/CN2018/093717, filed Jun. 29, 2018. (4pgs).
Written Opinion of the International Searching Authority, dated Mar. 27, 2019, in International Application No. PCT/CN2018/093717, filed Jun. 29, 2018. (4pgs).
Liu et al.,"SSD: Single Shot MultiBox Detector," arXiv preprint arXiv:1512.02325, 2016. (15 pgs).
Howard et al.,"MobileNets: Efficient Convolutional Neural Networks for Mobile Vision Applications," arXiv preprint arXiv: 1704.04861, 2017. (9 pgs).
Liu et al.,"Learning Efficient Convolutional Networks through Network Slimming," arXiv preprint arXiv: 1708.06519, 2017. (10 pgs).
Movidius: VPU Product Brief, [online], [Retrieved Oct. 9, 2019]. Retrieved from Internet <URL:https://uploads.movidius.om/1463156689-2016-04-29_VPU_ProductBrief.pdf> (2 pgs).
Moloney et al.,"Myriad 2:Eye of the Computational Vision Storm" [online], [Retrieved Oct. 9, 2019]. Retrieved from Internet <URL:https://www.hotchips.org/wp-content/uploads/hc_archives/hc26/HC26-12-day2-epub/HC26.12-6-HP-ASICs-epub/HC26.12.620-Myriad2-Eye-Moloney-Movidius-provided.pdf> (18pgs).
Notification of Reasons for Refusal, dated Oct. 11, 2020, in Japanese Patent Application No. JP2020-572465A, and the machine translation. (10pgs).
Chinese Office Action dated Mar. 1, 2023, in Chinese Application No. 201880057306.7 (15pgs).

* cited by examiner

200

400

SYSTEMS AND METHODS FOR LOW-POWER, REAL-TIME OBJECT DETECTION

CROSS-REFERENCE TO RELATED APPLICATIONS

This patent application is filed pursuant to 35 USC § 371 as a US National Phase Application of International Patent Application No. PCT/CN2018/093717, filed on Jun. 29, 2018, entitled "SYSTEMS AND METHODS FOR LOW-POWER, REAL-TIME OBJECT DETECTION," listing Haofeng Kou, Kuipeng Wang, Le Kang, Xuejun Wang, and Yingze Bao as inventors, which patent document is incorporated by reference herein in its entirety and for all purposes.

TECHNICAL FIELD

The present disclosure relates generally to systems and methods for object detection, especially real-time face detection that can provide improved performance, features, and uses.

BACKGROUND

Face detection is a computer technology used in a variety of applications that identifies human faces in digital images. Some face detection techniques are based on variations of deep learning networks running on serial processors which are prohibitively slow without parallel computing co-processors like graphics processing units (GPUs), because there is quite a lot of computation for face detection using deep learning algorithm.

For a mobile face detection system, besides performance, power and energy efficiency also become two of the main limiters, from perspectives of absolute energy efficiency and thermal power dissipation. Mobile computing has been one major driving factor behind the trend of pursing higher absolute energy efficiency and lower thermal power dissipation. The concern with energy efficiency is not limited to always-on mobile computing. The processor's energy efficiency, in the form of performance per watt, has become a key metric.

Furthermore, processors for mobile computing have issues to the application of face detection. The hard real-time requirements imposed by managing low-latency face detection deep learning computer vision algorithm are very challenging to be satisfied on even a capable platform running an operating system such as Linux or Android, which has not been expressly designed for low latency. Additionally, satisfying the computational requirements of face detection deep learning applications requires almost all of the computational resources on a typical application processor.

Accordingly, what is needed are systems and methods for real-time face detection that can provide improved performance, features, and uses.

SUMMARY

In a first aspect, the present disclosure provides an apparatus, including a camera sensor to capture one or more image frames; a memory storing at least a first object-detection model and a second object-detection model; a processor comprising a first CPU core, a second CPU core, and a plurality of shaves for processing, in which: the first CPU core is configured to run a first instance of an operating system to handle general CPU tasks for the apparatus; and the second CPU core is configured to run a second instance of an operating system to handle the image frames and to schedule computation tasks to be implemented by the plurality of shaves for the first object-detection model and the second object-detection model to detect an object in one or more image frames.

In a second aspect, the present disclosure provides an apparatus including a camera sensor generating at least one image frame; a memory storing at least one object-detection model; a processor comprising a first CPU core, a second CPU core, and a plurality of shaves for processing, in which: the first CPU core is configured to run a first instance of an operating system to handle general CPU tasks for the apparatus; and the second CPU core is configured to run a second instance of an operating system to handle the at least one image frame and to schedule computation tasks implemented by the plurality of shaves using the at least one object-detection model to detect an object in the at least one image frame, wherein an image frame is partitioned into a plurality of partitions with each partition assigned to one shave for computation, the second CPU dynamically updating computation tasks based on implementation of the scheduled computations by the plurality of shaves.

In a third aspect, the present disclosure provides a method, including: capturing, by a camera sensor, one or more image frames; receiving the one or more image frames at a processor comprising a first CPU core, a second CPU core, and a plurality of shaves for computation processing, the first CPU core is configured to run a first instance of an operating system to handle general CPU tasks for the apparatus, the second CPU core is configured to run a second instance of an operating system to handle processing of the one or more image frames; and scheduling computation tasks, by the second CPU core, to be implemented by the plurality of shaves using a first object-detection model and a second object-detection model to detect an object in the one or more image frames; and selecting computation results from the object-detection model, between the first object-detection model and the second object-detection model, with a higher detection probability to form an output for object detection in the one or more image frames.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures are not to scale.

DETAILED DESCRIPTION OF EMBODIMENTS

Figure 1:
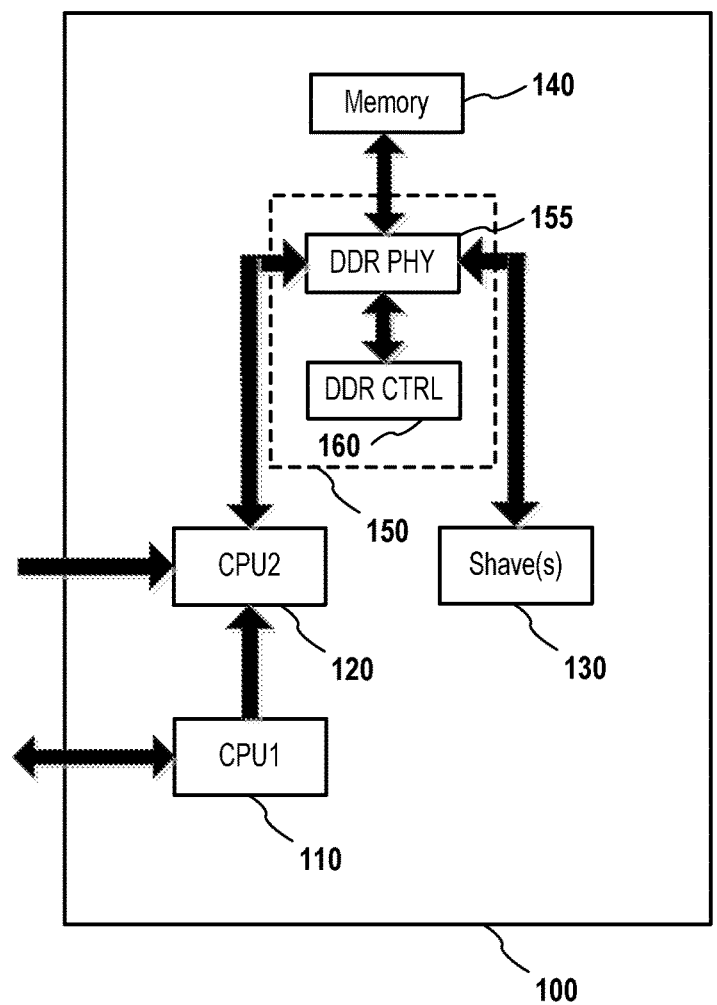
FIG. 1 depicts a platform architecture for an object detection processor system according to embodiments of the present document.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections. Embodiments herein may be described, by way of example, in the context of face detection; however, it shall be noted that other objects may be detected. It shall also be noted that an image may be a still image or may be an image frame from a video.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. The phrase "real-time" shall be understood to mean real-time or near real-time as all processing includes some delays. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Face detection has been used in a variety of applications that identifies human faces in digital images, which may contain various objects that are not faces, such as landscapes, buildings, and non-facial parts of humans, e.g., legs, shoulders and arms. Some face detection techniques are based on variations of deep learning networks running on serial processors which are prohibitively slow without parallel computing co-processors like graphics processing units (GPUs), because there is quite a lot of computation for face detection using deep learning algorithm. Face detection has applications including not only facial recognition, but also non-recognition applications, such as auto-focus cameras, etc.

For a mobile face detection system, besides performance, power and energy efficiency also become two of the main limiters, from perspectives of absolute energy efficiency and thermal power dissipation. Mobile computing has been one major driving factor behind the trend of pursing higher absolute energy efficiency and lower thermal power dissipation. The concern with energy efficiency is not limited to always-on mobile computing. The processor's energy efficiency, in the form of performance per watt, may be a key metric.

Furthermore, processors for mobile computing have challenges in implementing application of face detection. The hard real-time requirements imposed by managing low-latency face detection deep learning computer vision algorithms are very challenging to be satisfied on even a capable platform running an operating system such as Linux or Android, which has not been expressly designed for low latency. Additionally, satisfying the computational requirements of face detection deep learning applications requires almost all of the computational resources on a typical application processor.

In recent years, different approaches have been proposed for implementing face detection on smartphone, e.g. Apple's iPhone®, or Android™ based phones.

Some of implementation methods require smartphone being used as the carrier and therefore are not easy to be ported or deployed into other markets, like smart home, city, etc. For face detection system implemented using a smartphone, its performance is limited by mobile processors and operation system (OS) of the smartphone. Some mobile OS may not be able to achieve hard real-time performance.

Furthermore, implementing face detection on smartphone may need to fully exercise the resources of the smartphone, not only the application processor but also the co-processors. Power consumption for implementing face detection on a smartphone can be around 5 W~10 W, which may limit operation of other applications (or Apps) on the smartphone.

B. Embodiments of Object-Detection Architectures

In one or more embodiments, an architecture for implementing the deep learning based real-time face detection on an always-on, super low power consumption mobile device is disclosed. The architecture may enable more opportunities for deploying face detection technology into a wide range of application areas.

FIG. 1 depicts a platform architecture for a real-time operation system (RTOS) face detection processor system 100 according to embodiments of the present document. The processor system 100 comprises a first central processing unit (CPU) core 110, a second CPU core 120, a plurality of digital signal processors called shaves (or computation engines) 130 capable of operating in parallel with isolated power island to limit the power consumption under always-on style face detection implementation. In one or more embodiments, the first CPU core 110 and the second CPU core 120 are configured to handle separate tasks specifically. For example, the first CPU core is configured to handle general operating system (OS) tasks, while the second CPU core is configured to handle images and scheduling computation tasks to be done by the shaves 130, such that embedded real-time multiple threading operation may be enabled.

In one or more embodiments, the platform 100 (a term interchangeably with "xcore" or "processor system" hereinafter) further comprises a memory 140 such as a dynamic random-access memory (DRAM), such as double data rate (DDR) RAM. A CPU core may implement read/write operation to the memory via a memory controller 150, which may comprise a physical layer 155 and a control layer 160. Although not depicted in FIG. 1, each CPU may have direct access to memory 140 via a memory controller 150.

In one or more embodiments, the first CPU core 110 is configured to run a first operating system (OS) instance, while the second CPU core is configured to run a second OS instance different from the first OS instance. With multiple face detection models and multiple shaves, the platform may be configured to manage multiple model scheduling for different face detection networks/models with optimization on face detection deep learning computation libraries to achieve desired performance on an always-on low power consumption mobile device.

Figure 2:
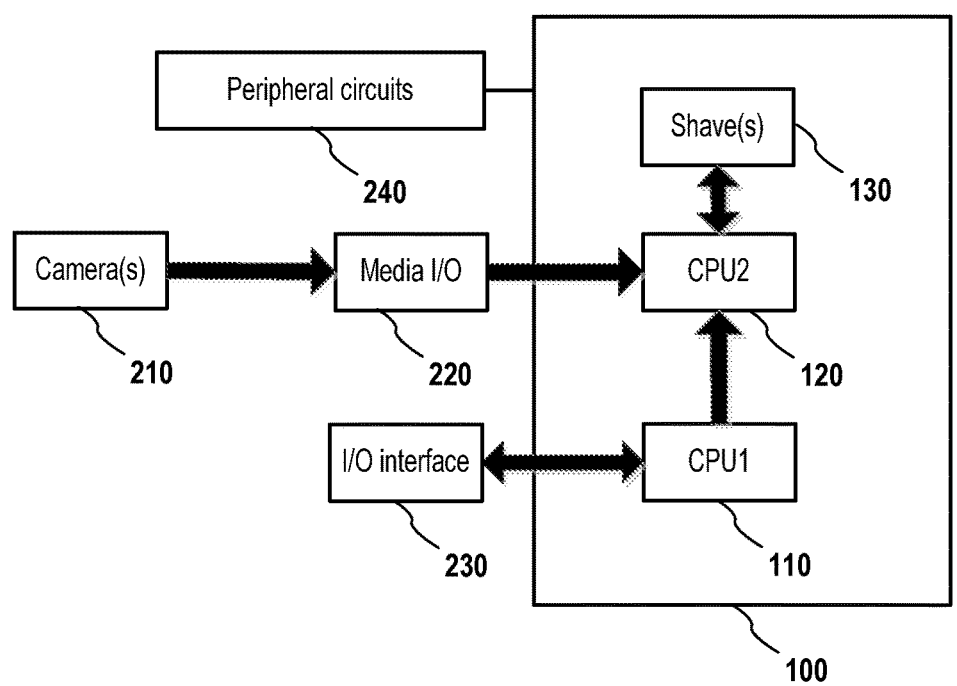
FIG. 2 depicts an object detection system according to embodiments of the present document.

FIG. 2 depicts a RTOS face detection system according to embodiments of the present document. As shown in FIG. 2, the RTOS face detection system 200 comprises an xcore 100, one or more camera sensors 210 to capture images, a media interface 220 for communication between the one or more camera sensors 210 and the xcore 100. The RTOS face detection system 200 may further comprise general I/O interface(s) 230 and peripheral circuit(s) 240 coupled to or included with the xcore 100. In one or more embodiments, the media interface 220 may be a high-speed graphics card, such as an Ultra Port Architecture (UPA) bus, for CPU interconnection. The media interface 220 may also be a High-Definition Multimedia Interface (HDMI) to support transmitting uncompressed video data and compressed or uncompressed digital audio data from HDMI-compliant camera(s). In one or more embodiments, the general I/O interface(s) 230 may be an Ethernet interface, a wireless communication interface, a Joint Test Action Group (JTAG) interface, a General-purpose input/output (GPIO) interface, a mobile industry processor interface (MIPI), and/or a Secure Digital Input Output (SDIO) interface, etc. In one or more embodiments, the peripheral circuit(s) 240 may include a system clock circuit, a power management integrated circuit (PMIC) for power management of the system, etc. Additional or alternative components may be one or more of those disclosed in reference to FIG. 11, below.

Figure 3:
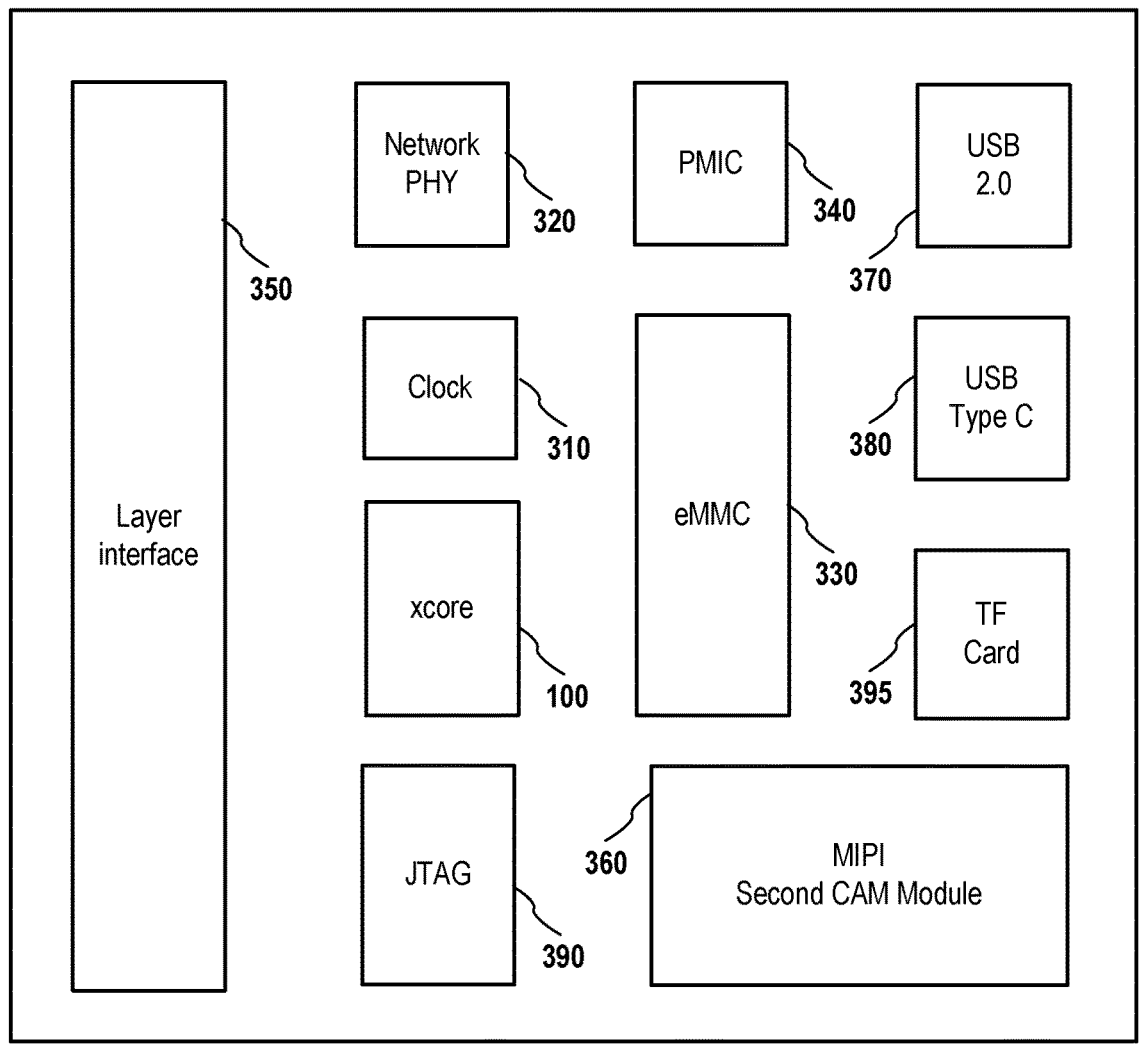
FIG. 3 depicts a bottom layer of a printed circuit board (PCB) functional block diagram according to embodiments of the present document.
Figure 4:
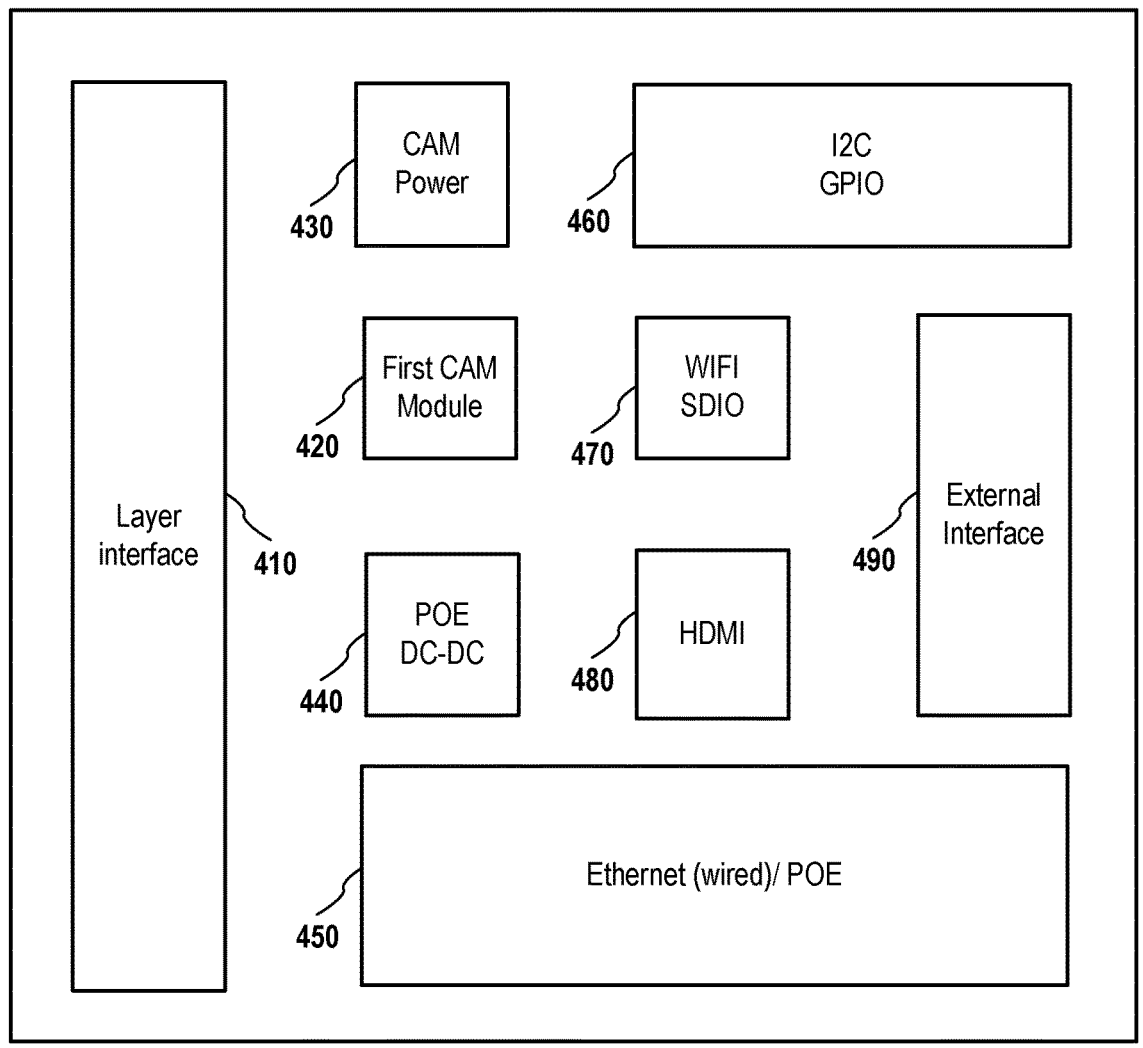
FIG. 4 depicts a top layer of a PCB functional block diagram according to embodiments of the present document.

In embodiments, one or more components of the RTOS face detection system may be integrated on a PCB for face detection implementations/applications. FIG. 3 and FIG. 4 respectively depict a bottom layer PCB functional block diagram and a top layer PCB functional block diagram of an exemplary double layer PCB for implementing face detection, according to embodiments of the present document.

It shall be noted that the illustrations in FIGS. 3 and 4 and corresponding descriptions are under specific configuration using a specific embodiment or embodiments; accordingly, these illustrative examples shall not be used to limit the scope of the disclosure of the current patent document. In one or more embodiments, the components shown in FIGS. 3 and 4 may be interconnected (connection not shown in FIGs) via wires, pads, soldering, conductive via holes, etc. The components shown on the bottom and top layers are for illustration and shall not be used to limit framework implementations.

As shown in FIG. 3, the bottom layer PCB functional block diagram comprises the xcore 100, a system clock circuit 310, a network physical layer 320, an embedded multimedia card (eMMC) 330 as an embedded non-volatile memory storage, a power management integrated circuit (PMIC) 340 for power management of the system, a layer interface 350, a Mobile Industry Processor Interface (MIPI) 360 to enable interconnect essential components in a mobile framework. In one or more embodiments, the MIPI 360 may be used as a second camera module to accommodate communication with a camera having different parameters. The eMMC 330 may be configured to store multiple face detection models, which may or may not be pre-trained.

In one or more embodiments, the bottom layer PCB functional block may further comprise additional components, including a USB (2.0, or 3.0) interface 370, a type C USB interface 380 to allow charging, data transfer, and video in one simple connector, a JTAG interface 390 for design verifying and PCB testing, a TransFlash (TF) card 395 to enable read/write operation for removable miniaturized Secure Digital flash memory cards. One skilled in the art shall understand various configurations different from FIGS. 3 and 4 may be adopted for framework implementation; such variations shall be within the scope of this disclosure.

As shown in FIG. 4, the top layer PCB functional block diagram comprises a layer interface 410, a first camera module 420 to provide real-time frame-by-frame images, a camera power circuit 430 to power the camera module, a Power-over-Ethernet (PoE) DC-DC converter 440 as an isolated DC converter, a wired Ethernet interface 450 (which may have POE capacity), an inter-integrated circuit (I2C) General Purpose I/O (GPIO) interface 460 to allow "slave" digital integrated circuits to communicate with "master" chips, a Wi-Fi Secure Digital Input Output (SDIO) circuit 470 to enable secured wireless communication, a High-Definition Multimedia Interface (HDMI) 480 for transmitting uncompressed video data and compressed or uncompressed digital audio data from an HDMI-compliant source device (e.g., the camera module 420), and an external interface 490 for communication to additional peripheral devices.

In embodiments, different applications may require different camera parameters. The camera modules 420 and 360 may be customized and exchanged. Similarly, to dealing with different communication requirements, the communication interface (Ethernet, USB, HDMI and WIFI) may be adjusted accordingly, and/or be extended to other functions through I2C and GPIO bus.

By using a double layer PCB configuration, the area of the XY axis of the PCB may be very small, e.g., a size of 4 cm×4 cm suitable to fit in various applications requiring or preferring small size, such as an intelligent security camera, an industrial robot, an intelligent home product, such as a doorbell or security system, and etc. With a small area, the structure and appearance of a product may be better designed, because in general, a small rectangular cube is better in structure than a single layer board with a larger area. It shall be noted that different PCB shapes and/or configurations may be employed.

In one or more embodiments, the face detection framework is operated using a customized operation system (also referred as with "xos" hereinafter), which is a combination of a real-time operating system (RTOS) on top of Real-Time Executive for Multiprocessor Systems (RTEMS), which is an open source real-time operating system, to achieve hard real-time performance with low latency for improved performance.

C. Embodiments of Object-Detection Models

In one or more embodiments, at least one object-detection model (e.g., face detection model) is used for implementing real-time image detection in one or more image frames. The at least one object-detection model may comprise a first object-detection model and a second object-detection model, which may be implemented in parallel for object-detection from the same input, which may be a full image frame or a section of a full frame. In one or more embodiments, the first object-detection model and the second object-detection model may be configured for optimized performance from different perspectives. For example, the first object-detection model may perform face detection from a first view angle, e.g., front face, while the second object-detection model may be optimized for face detection from a second view angle, e.g., a side/profile face image. In another example, the first object-detection model may be configured for face detection from images with higher clarity, while the second object-detection model may be designated for face detection from blurred image. In one or more embodiments, the first object-detection model and the second object-detection model are deep learning neural networks comprising a plurality of layers. For smaller size and higher implementing speed, the first object-detection model and the second object-detection model may share at least one layer or share parameters for at least one layer among the plurality of layers. In one or more embodiments, the object-detection models may be pre-trained and stored in non-volatile memory storage, e.g. the eMMC 330.

Figure 5:
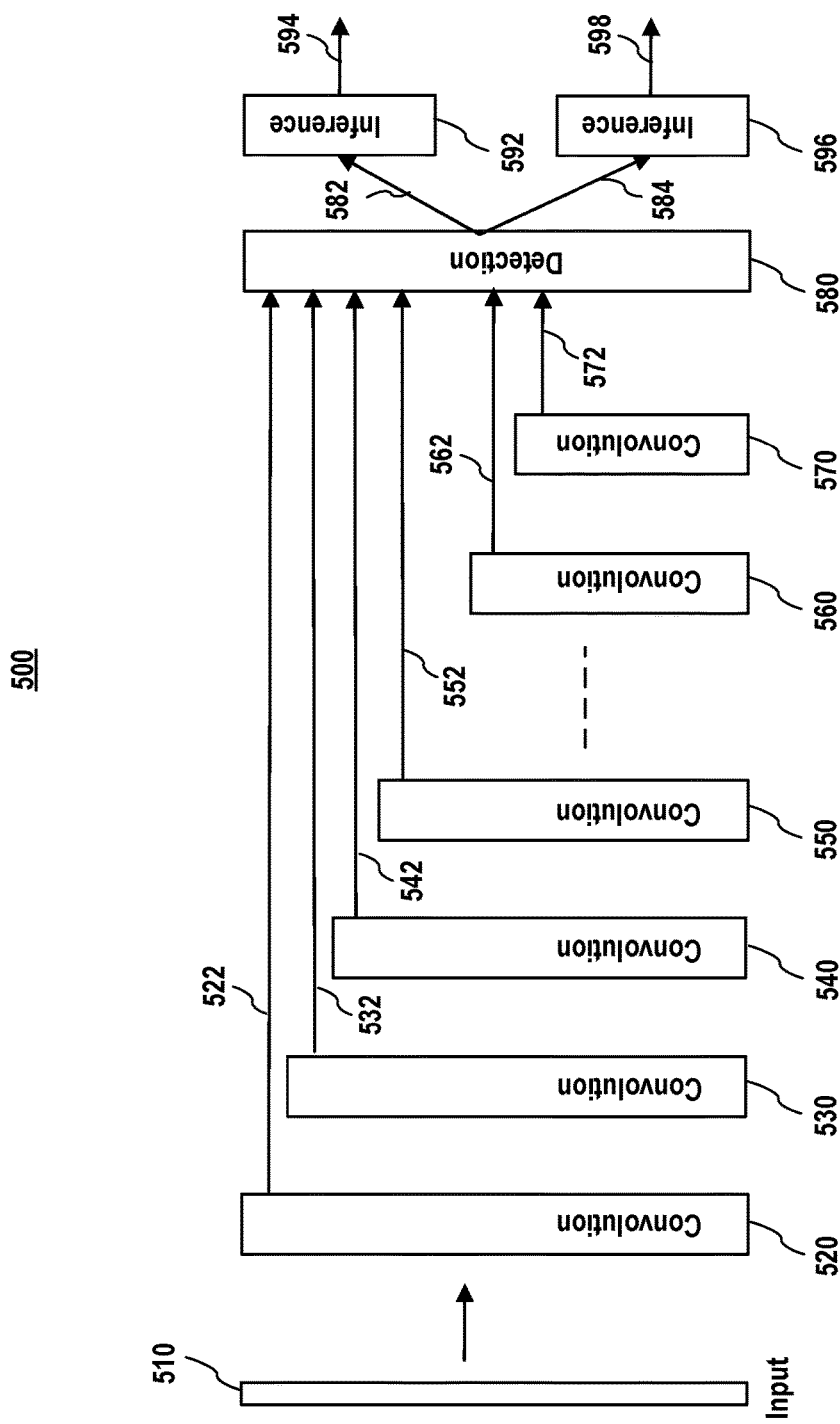
FIG. 5 graphically depicts an object-detection model structure according to embodiments of the present document.

According to embodiments of the present document, FIG. 5 graphically depicts an example object-detection model structure 500. In one or more embodiments, the object-detection model structure 500 may be evolved from a deep learning model based on a convolutional network comprising a plurality of convolutional layers 520~570 to form multiple bounding boxes from an image input 510. In one or more embodiments, the face detection model may use or may be based upon the Single Shot Multibox Detection (SSD) model or the MobileNet SSD model. In one or more embodiments, the first object-detection model and the second object-detection model may share at least one convolutional layer to lower storage requirement and improve operation efficiency. In one or more embodiments, the models share the same layers to the bounding box identification layer (e.g., the "conv11_mbox_loc_flat" layer) and may branch from that point for the different models to account for different detection capabilities. One skilled in the art shall understand that the face detection model may further comprise additional layers or procedures, such as ReLU layers, striding and/or pooling, etc. for desired performance and efficiency.

In one or more embodiments, the convolutional layers 520~570 respectively produce a plurality of bounding boxes (or anchor boxes) 532~572 to encode or comprise one or more features within each corresponding bounding box. Each convolutional layer may have a set of convolutional filters to produce a set of detection predictions. The bounding boxes 532~572 have different parameters (e.g., different scales, aspect ratios, confidence scores, etc.). In one or more embodiments, bounding boxes from earlier stages of convolutional layers have relatively larger size than bounding boxes from later stages of convolutional layers.

In one or more embodiments, the bounding boxes 532~572 are fed into a detection module 580 to produce collections of bounding boxes 582~584 with each box associated with a confidence score and box location parameters, which may be represented by coordinates of left upper corner and lower right corner, although other size and location identification mechanisms may be used. In one or more embodiments, the collections of bounding boxes 582 and 584 may be the same. In one or more embodiments, the detection module 580 may apply a confidence threshold to filter out bounding boxes having confidence scores below the threshold. In one or more embodiments, the first object-detection model and the second object-detection model may use different inference modules to process the collections 582 and 584 of bounding boxes to get respective detection results. For example, the first object-detection model may use the first inference module or modules 592 to infer a first detection result 594, while the second object-detection model may use the second inference module or modules 596 to infer a second detection result 598. In one or more embodiments, the outputs of the first and second object-detection models are detection expectations for the collection of the bounding boxes. Each bounding box has an associated score representing detection probability, ranging from 0.0 to 1.0, that represents how likely the bounding box contains the object to be detected, e.g., a face. In one or more embodiments, for object-detection in a single bounding box, the output from the object-detection model with a higher detection probability is selected as the image detection output for the single bounding box. Ultimately, an object-detection output for a whole image frame comprising multiple bounding boxes may comprise one or more outputs using the first object-detection model and one or more outputs using the second object-detection model, depending on comparison of detection probability for each bounding box between the first object-detection model and the second object-detection model. In one or more embodiments, if both the first and second object-detection models outputs a score below a predetermined threshold or thresholds (e.g., a model may have its own thresholding standards) for a bounding box, the ultimate object-detection output for the bounding box is categorized as no detected image.

In one or more embodiments, the different object-detection models may be configured or optimized for object-detection from different perspectives or to detect different objects. One skilled in the art shall understand that the difference between the different models may be realized by various implementations, such as different striding and/or pooling, etc. Such variations of differentiating the object-detection models shall be within the scope of this disclosure.

In one or more embodiments, during operation, layers of the object-detection models may be loaded into the DRAM memory 140 and distributed or split among the plurality of shaves 130 for parallel computation. In one or more embodiments, a portion of the face detection models, such as a network portion of the models, may be loaded into associated caches of the plurality of shaves 130, while other portions of the models larger in size, such as weight parameters, are loaded into the RAM memory 140 for implementation.

In one or more embodiments, during a training stage, images of faces under different sizes, poses, and conditions were collected for model training. To enhance the detection robustness, various data augmentation is applied to the training, including cropping, flipping, cutout, additive/multiplicative noise, color shift, saturation change, contrast change. After training, the deep learning neural networks may be pruned using one or more slimming techniques to achieve a smaller size and a higher implementing speed. In one or more embodiments, the first object-detection model and the second object-detection model may be trained separately and then combined or trained together as a combined model. In one or more embodiments, one object-detection model may be trained first to fix one or more layer weights/parameters. Then, in one or more embodiments, a different object-detection model may be trained with the shared layers having their weights fixed but the remaining layers are trained specific for that model.

In one or more embodiments, the training of the models may be done using the same or different datasets, including completely different datasets or merely different subsets of the datasets. For example, in one or more embodiments, a first specialized dataset and a second specialized dataset may be used for training the first object-detection model and the second object-detection model, respectively. In one or more embodiments, after training with specialized datasets for each object-detection model, the first object-detection model and the second object-detection model may be joint-trained using a training data set comprising data from both the first and the second specialized data sets.

D. Embodiments for Implementing Face Detection

Figure 6:
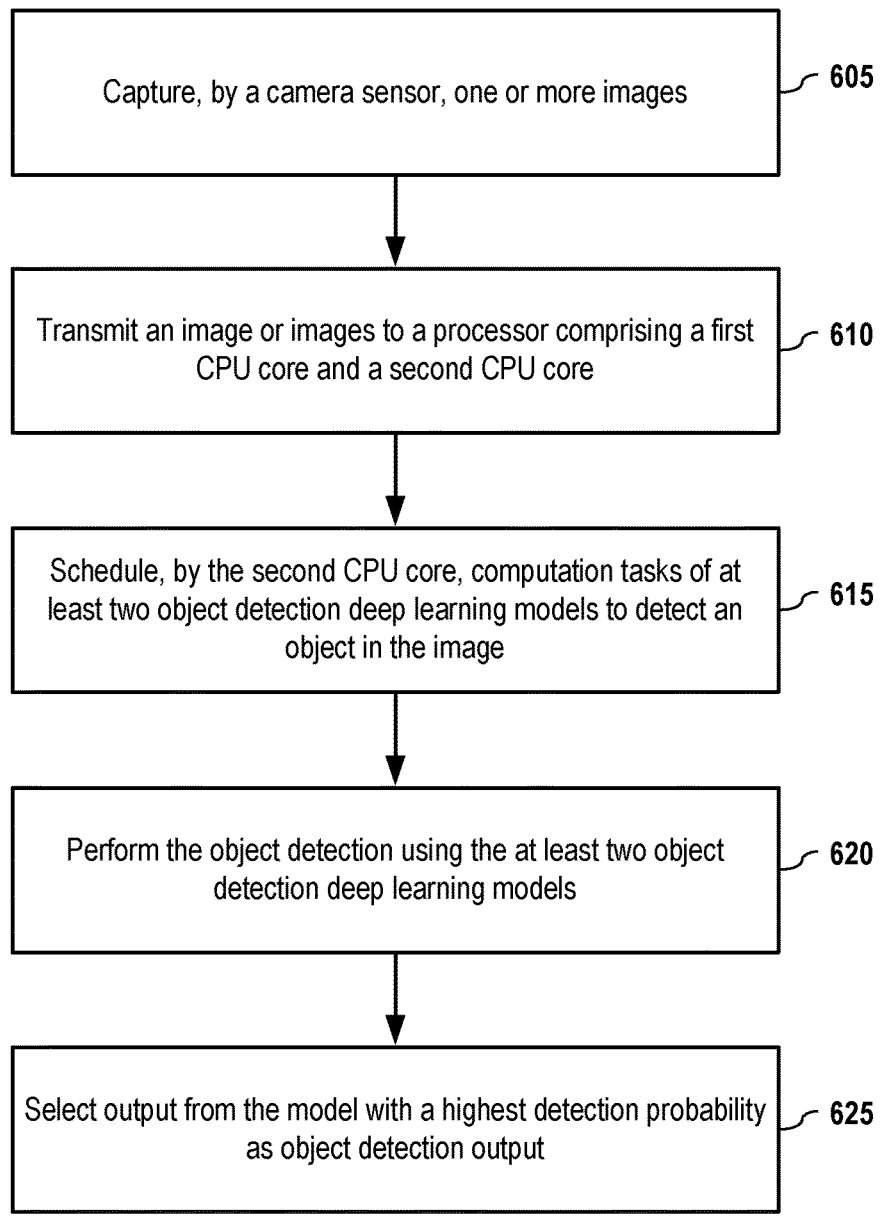
FIG. 6 depicts a process for implementing face detection according to embodiments of the present document.

FIG. 6 depicts a method for implementing face detection according to embodiments of the present document. First, a camera sensor captures (605) one or more images. In one or more embodiments, the one or more images are transmitted (610) to a processor comprising a first CPU core, a second CPU core, and a plurality of digital signal processors (shaves). The second CPU core may be used to schedule (615) computation tasks of at least two object detection deep learning models to detect an object or objects in an image or images. In one or more embodiments, the second CPU in conjunction with the shaves perform (620) computations of the object detection processing for the at least two object detection deep learning models and generate an output for each image detection model. Finally, in one or more embodiments, the output from the model with a highest detection probability is selected (625) as image detection output or part of the image detection output, although other selection criterion or criteria may be used.

In one or more embodiments, each image frame may comprise one or more possible human faces with different clarities, orientations, or sizes. Each image frame is processed as a thread with face detection for the one or more possible human faces. Depending on detection probability of the first and second deep learning detection models, the face detection system may have final face (image) detection outputs corresponding to the one or more possible human faces from the same or different detection models.

Figure 7:
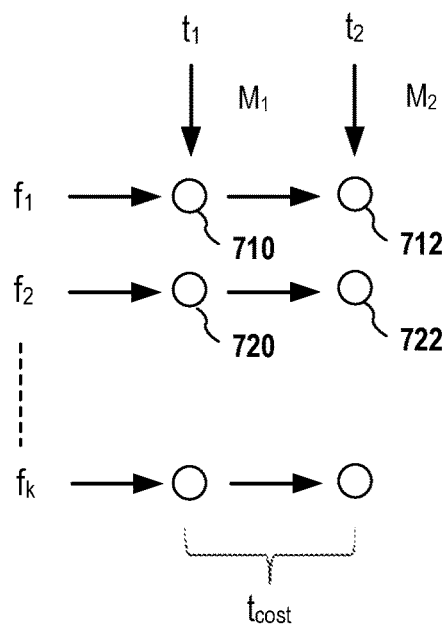
FIG. 7 graphically depicts a multiple-model scheduling mechanism for multiple image frames according to embodiments of the present document.

FIG. 7 graphically depicts a multiple-model scheduling mechanism for multiple image frames according to embodiments of the present document. As shown in FIG. 7, multiple real-time image frames $f_1 \ldots f_k$ are transmitted to the face detection system for face detection processing. The system incorporates two different models $M_1$ and $M_2$ for face detection implementation. In embodiments, the frames are processed in a sequentially order, e.g. the first frame $f_1$ is processed using the first face detection model $M_1$ to generate a first output 710 corresponding the first frame $f_1$, and then processed using the second face detection model $M_2$ to generate a second output 720 corresponding the first frame $f_1$. Once the first image frame is processed, the second CPU takes the second image frame $f_2$ and schedule for sequential processing using the first face detection model $M_1$ and the second face detection model $M_2$ to generate a first output 720 and a second output 722 corresponding to the second frame $f_2$. Such process continues until the last image frame $f_k$.

In one or more embodiments, once the face detection schedules a computation of an image frame using a detection model, the image frame and at least a portion of the detection model (e.g., a network portion of the model) may be distributed and loaded among the plurality of shaves 130 for parallel computation. The results of parallel computation from the plurality of shaves 130 are then merged together for a final output of the detection model corresponding to the image frame. The final output is then transferred to the memory and transmitted via an Ethernet interface or a USB interface.

In one or more embodiments, when the image frames are HD image frames with large pixel size per frame and the frame rate from the camera is high, it is challenging to keep the face detection operation to achieve hard real-time performance using the sequential scheduling mechanism shown in FIG. 7, since the time period $t_{cost}$, defined by the time difference between the instant $t_1$ (first model starting operation for a frame) and the instant $t_2$ (second model finished operation for the frame), needs to be very small to be in pace of the frame rate from the camera.

Figure 8:
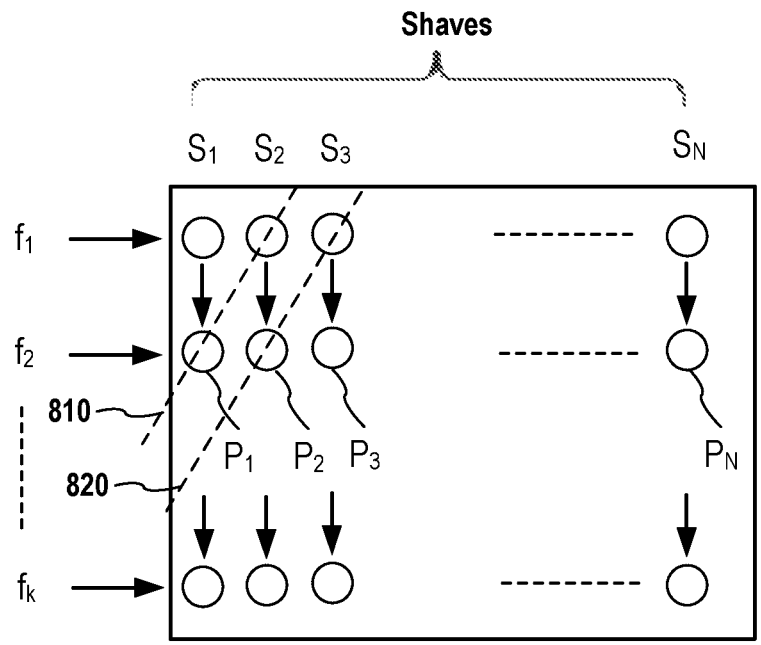
FIG. 8 graphically depicts multiple threading programming to achieve real-time face detection according to embodiments of the present document.

FIG. 8 graphically depicts multiple threading programming to achieve real-time face detection according to embodiments of the present document. Multiple threading programming is desired to overcome the limitation of the embodiment shown in FIG. 7 for improved performance in hard real-time face detection implementation. As shown in FIG. 8, each image frame ($f_1 \ldots f_k$) is partitioned into a plurality of partitions ($P_1 \ldots P_N$), which are processed using the plurality of shaves ($S_1 \ldots S_N$) for parallel computation. Since each partition of an image frame is independent from other partitions, once a shave finishes computation for a partition of current image frame, it is able to handle a partition for next image frame without affecting computation of other shaves. The dynamic scheduling of multiple image frames (threads) is handled by the second CPU for coordination among the shaves.

In embodiments, the plurality of shaves may process multiple threads in parallel, with some shaves processing one image frame, while some shaves processing next image frame. The collection of frame partitions being processed simultaneously in parallel at a given instant is referred as a wave front, shown as dashed line 810 or 820 in FIG. 8. The chronological frame span for a wave front may be equal or larger than 2, e.g., the shaves are processing two or more frames simultaneously. Such a configuration reduces waiting time for the shaves and thus maximizes shave computation efficiency for improved real-time performance. Once all partitions of an image frame are processed, the results of all partition are then merged for an output corresponding to the image frame.

In one or more embodiments, an image frame may comprise multiple potential images of human faces for detection. Consequently, each output from a face detection model corresponding to the image frame may comprise multiple sections with each section related to one potential human face. Depending on model structure and also human face parameters (clarity, contrast, orientation, noise, etc.), some human faces may have higher detection probability than other human faces. Furthermore, some human faces may have higher detection probability using one face detection model than using the other face detection model. Therefore, the final output of the face detection system for an image frame may be a combination of results using both face detection models, e.g., some sections of the final output are from the first model while some other sections of the final output are from the second model.

Figure 9:
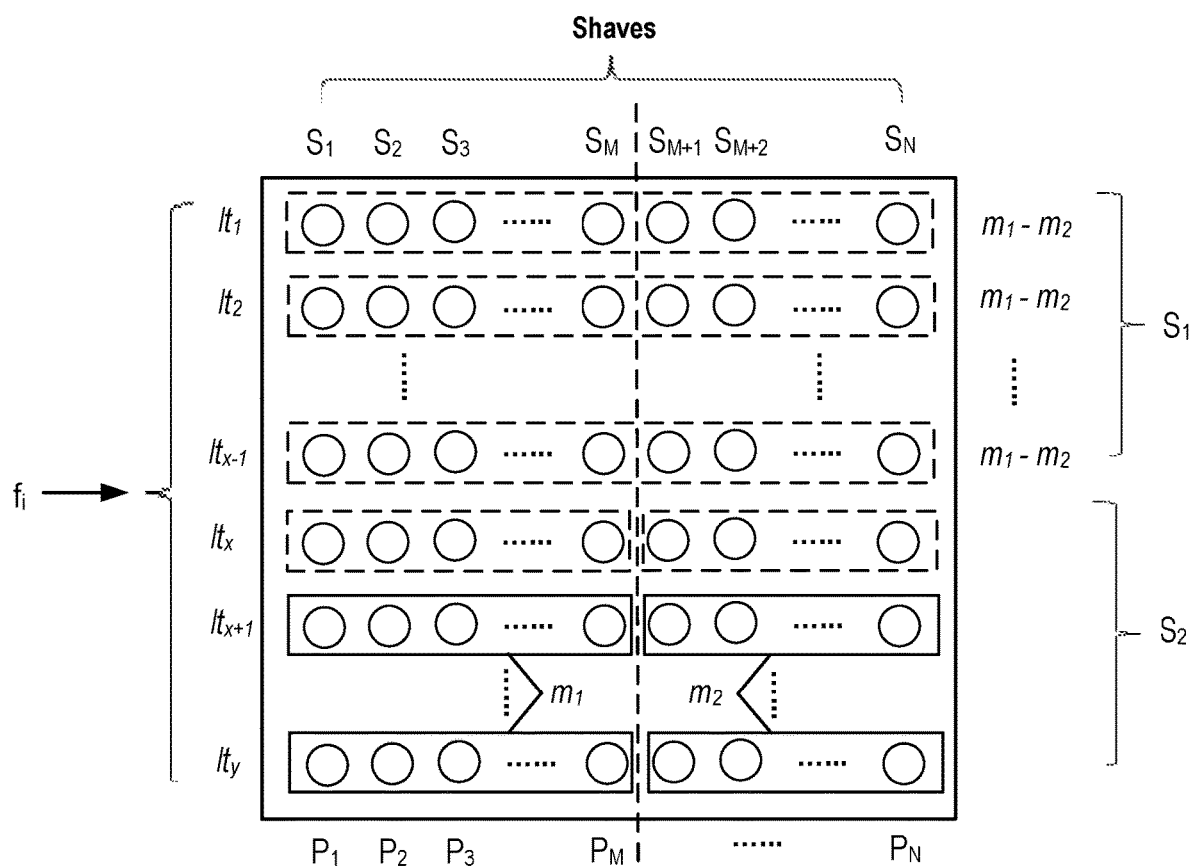
FIG. 9 graphically depicts parallel computation with two face detection models according to embodiments of the present document.

FIG. 9 graphically depicts parallel computation with two models for face detection in an image frame $f_i$ according to embodiments of the present document. As shown in FIG. 9, the image frame $f_i$, e.g. the first frame $f_1$, is partitioned into a plurality of partitions ($P_1 \ldots P_N$), which are processed by two face detection models ($m_1$ and $m_2$) using the plurality of shaves ($S_1 \ldots S_N$) for parallel computation. Both models comprise a plurality of layers (e.g. convolutional layers) for implementing face detection algorithm. In one or more embodiments, the two face detection models $m_1$ and $m_2$ share parameters or are the same for one or more layers. Therefore, the parallel computation is implemented across all shaves for the shared layers (from $lt_1$ until $lt_x$) in a shared stage ($S_1$), wherein the $lt_1$ in FIG. 9 is designated for computation at a chronological time step involving the first layer of the face detection model(s). When the computation goes to chronological time step involving the layer $lt_{x+1}$, where the face detection models do not share parameters, the shaves are divided into two shave group in an individual stage ($S_2$). The first shave group ($S_1 \sim S_M$ being an integer number less than N) is designated for the first face detection model $m_1$; and the second shave group ($S_{M+1} \sim S_N$) designated for the second face detection model $m_2$. In one or mode embodiments, in the individual stage, the shaves are divided equally between the face detection models, with each model taking half shaves for computation. In one or mode embodiments, in the individual stage, the shaves are divided unequally between the face detection models with the face detection model requiring more resources taking more shaves, such that the computation time for the two face detection models may be maintained approximately the same. For example, if face detection model $m_1$ is more complex (having more layers, or more parameters) than face detection model $m_2$, more shaves may be allotted to face detection model $m_1$.

Figure 10:
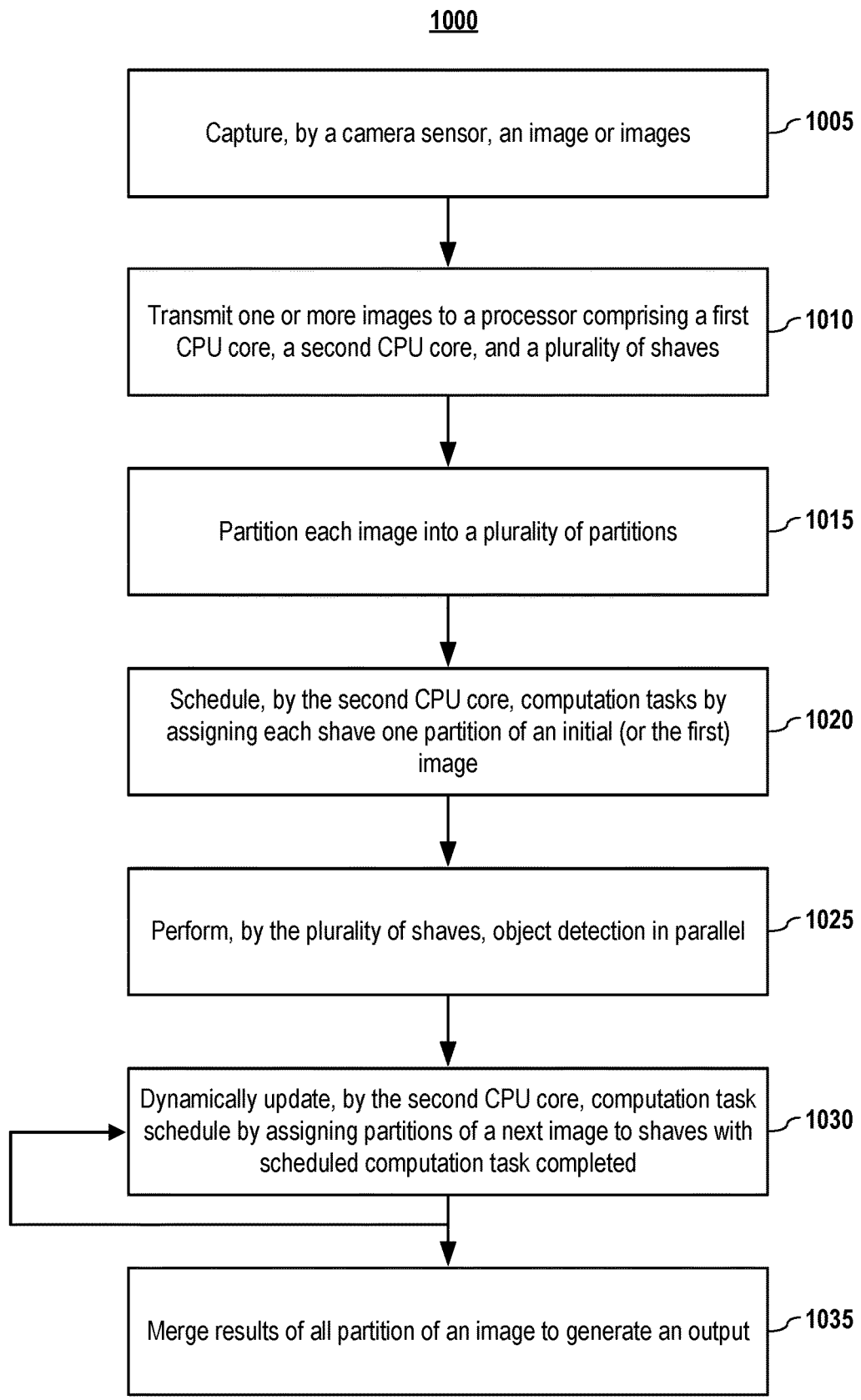
FIG. 10 depicts a process for implementing real-time multiple threading programming to achieve real-time face detection according to embodiments of the present document.

FIG. 10 depicts a process for implementing real-time multiple threading programming to achieve real-time face detection according to embodiments of the present document. Initially, a camera sensor captures (1005) one or more images. An image or images are transmitted (1010) to a processor comprising a first CPU core, a second CPU core, and a plurality of shaves. In one or more embodiments, the second CPU core partitions (1015) each image frame into a plurality of partitions, with the number of partitions for each frame equal to the number of the shaves. The second CPU core schedules (1020) computation tasks by assigning each shave one partition of an initial (or the first) image frame. The plurality of shaves perform (1025) the object detection in parallel using at least one object detection model. Embodiments of detailed parallel computing using at least one face detection model may be referred to descriptions related to FIG. 8 and/or FIG. 9. In one or more embodiments, the second CPU core dynamically updates (1030) computation task schedule by assigning partitions of a next image frame to shaves with scheduled computation task completed, such that those shaves do not wait until all shaves finish scheduled computation tasks. The process in step 1030 may be a self-updating step with the dynamic scheduling operating until all image frames are partitioned and assigned for computation. Once all partitions of an image frame are processed, the results of all partitions are then merged (1035) to generate an output corresponding to the image frame.

E. System Embodiments

In embodiments, aspects of the present patent document may be directed to, may include, or may be implemented on, utilize, or incorporated with one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smartphone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 11:
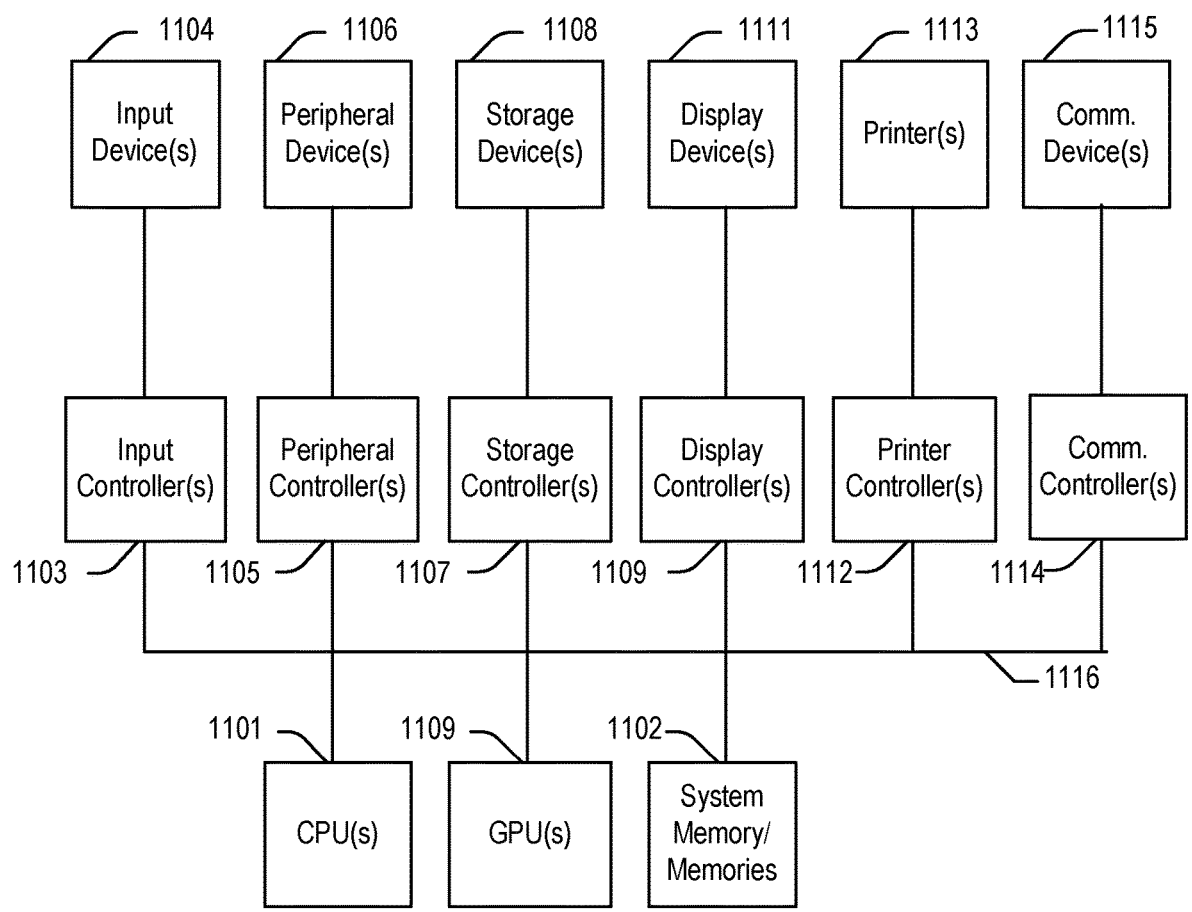
FIG. 11 depicts a simplified block diagram of a computing device/information handling system according to embodiments of the present document.

FIG. 11 depicts a simplified block diagram of a computing device/information handling system (or computing system) according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more central processing units (CPU) 1101 that provides computing resources and controls the computer. CPU 1101 may be implemented with a microprocessor or the like, and may also include one or more graphics processing units (GPU) 1119 and/or a floating-point coprocessor for mathematical computations. System 1100 may also include a system memory 1102, which may be in the form of random-access memory (RAM), read-only memory (ROM), or both.

A number of controllers and peripheral devices may also be provided, as shown in FIG. 11. An input controller 1103 represents an interface to various input device(s) 1104, such as a keyboard, mouse, touchscreen, and/or stylus. The computing system 1100 may also include a storage controller 1107 for interfacing with one or more storage devices 1108 each of which includes a storage medium such as magnetic tape or disk, or an optical medium that might be used to record programs of instructions for operating systems, utilities, and applications, which may include embodiments of programs that implement various aspects of the present disclosure. Storage device(s) 1108 may also be used to store processed data or data to be processed in accordance with the disclosure. The system 1100 may also include a display controller 1109 for providing an interface to a display device 1111, which may be a cathode ray tube (CRT), a thin film transistor (TFT) display, organic light-emitting diode, electroluminescent panel, plasma panel, or other type of display. The computing system 1100 may also include one or more peripheral controllers or interfaces 1105 for one or more peripherals 1106. Examples of peripherals may include one or more printers, scanners, input devices, output devices, sensors, and the like. A communications controller 1114 may interface with one or more communication devices 1115, which enables the system 1100 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. An apparatus comprising:
a camera sensor to capture one or more image frames;
a memory storing at least a first object-detection model and a second object-detection model; and
a processor comprising a first CPU core, a second CPU core, and a plurality of shaves for processing, in which:
the first CPU core is configured to run a first instance of an operating system to handle general CPU tasks for the apparatus; and
the second CPU core is configured to run a second instance of an operating system to handle the image frames and to schedule computation tasks to be implemented by the plurality of shaves for the first object-detection model and the second object-detection model to detect an object in one or more image frames.

2. The apparatus of claim 1 wherein the first object-detection model and a second object-detection model are deep learning models with each model comprising a plurality of model layers and the first object-detection model and the second object-detection model share at least some of the layers to reduce computation and resource requirements of the apparatus.

3. The apparatus of claim 1 wherein each image frame is partitioned into multiple partitions with a partition number equal to the number of the shaves, each shave is assigned with a partition for object detection computation.

4. The apparatus of claim 1 wherein the object detection is a combination of computation results selected from both object-detection models.

5. The apparatus of claim 2 wherein one of the first object-detection model and the second object-detection model is trained first to fix one or more shared layer weights.

6. The apparatus of claim 3 wherein computation results from each shave are merged to generate an output corresponding to the image frame.

7. The apparatus of claim 4 wherein for computation results selected from the first object-detection model, the first object-detection model has a high detection probability than the second object-detection model; for computation results selected from the second object- detection model, the second object-detection model has a high detection probability than the first object-detection model.

8. The apparatus of claim 7 wherein the first object-detection model and the second object-detection model are optimized for object-detection from different perspectives.

9. An apparatus comprising:
a camera sensor generating at least one image frame;
a memory storing at least one object-detection model; and
a processor comprising a first CPU core, a second CPU core, and a plurality of shaves for processing, in which:
the first CPU core is configured to run a first instance of an operating system to handle general CPU tasks for the apparatus; and
the second CPU core is configured to run a second instance of an operating system to handle the at least one image frame and to schedule computation tasks implemented by the plurality of shaves using the at least one object-detection model to detect an object in the at least one image frame, wherein an image frame is partitioned into a plurality of partitions with each partition assigned to one shave for computation, the second CPU dynamically updating computation tasks based on implementation of the scheduled computations by the plurality of shaves.

10. The apparatus of claim 9 wherein the number of partitions equal to the number of the shaves.

11. The apparatus of claim 9 wherein once all partitions of an image frame are processed, results of all partition are then merged for an output corresponding to the image frame.

12. The apparatus of claim 9 wherein the plurality shaves implement computation in parallel.

13. The apparatus of claim 9 wherein once one shave finishes scheduled computation task, the second CPU updates computation task for the shave by assigning a partition from a next image frame such that the shave starts computation without waiting for other shaves to finish computation for a current image frame.

14. The apparatus of claim 9 wherein the at least one object-detection model comprises a first object-detection model and a second object-detection model, the first object-detection model and the second object-detection model each comprises a plurality of layers with one or more layers sharing parameters, the computation tasks implemented by the plurality of shaves comprises:
for computation tasks involving layers sharing parameters, implementing parallel computation across all the plurality of shaves; and
for computation tasks involving layers not sharing parameters, dividing the plurality of shaves into a first shave group designated for the first object-detection model and a second shave group designated for the second object-detection model, implementing parallel computation with the first shave group designated for the first object-detection group and the second shave group designated for the second object-detection model.

15. A method for low power image detection, the method comprising:
capturing, by a camera sensor, one or more image frames;
receiving the one or more image frames at a processor comprising a first CPU core, a second CPU core, and a plurality of shaves for computation processing, the first CPU core is configured to run a first instance of an operating system to handle general CPU tasks, the second CPU core is configured to run a second instance of an operating system to handle processing of the one or more image frames;
scheduling computation tasks, by the second CPU core, to be implemented by the plurality of shaves using a first object-detection model and a second object-detection model to detect an object in the one or more image frames; and
selecting computation results from between the first object-detection model and the second object-detection model based upon which has a higher detection probability to form an output for object detection in the one or more image frames.

16. The method of claim 15 wherein the first object-detection model and the second object-detection model are deep learning object-detection models comprising a plurality of convolutional layers, the first object-detection model and the second object-detection model share at least one convolutional layer.

17. The method of claim 16 wherein the first object-detection model and the second object-detection model are pre-trained deep learning object-detection models.

18. The method of claim 17 wherein the first object-detection model and the second object-detection model are trained separately and then combined.

19. The method of claim 18 wherein one of the first object-detection model and the second object-detection model is trained first to fix parameters of one or more shared model layers and the second object-detection model comprises the fixed parameters of the one or more shared model layers but is trained to train one or more other layers to allow for differences in object detection.

20. The method of claim 19 wherein the first object-detection model and the second object-detection model are trained first with a first specialized data set and a second specialized data set respectively, and then trained jointly with a training data set comprising data from both the first and the second specialized data sets.

* * * * *